Patented Nov. 4, 1952

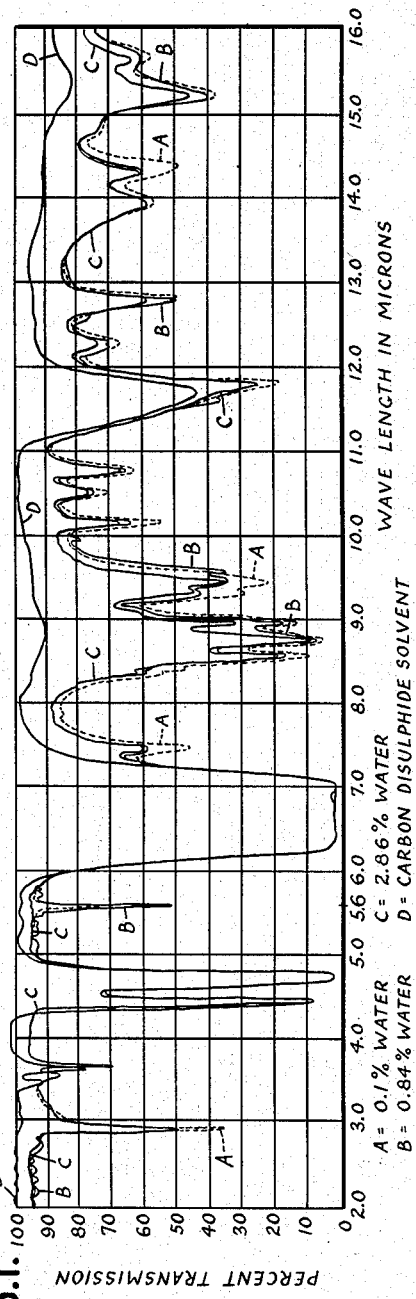
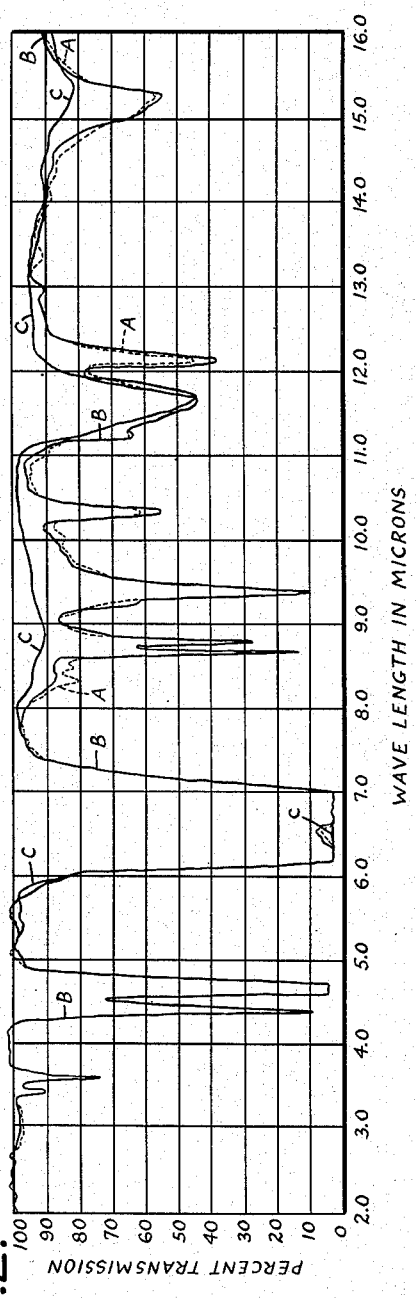
INVENTORS.
EVERETT E. GILBERT
SILVIO L. GIOLITO
BY Elizabeth Hunter
ATTORNEY.

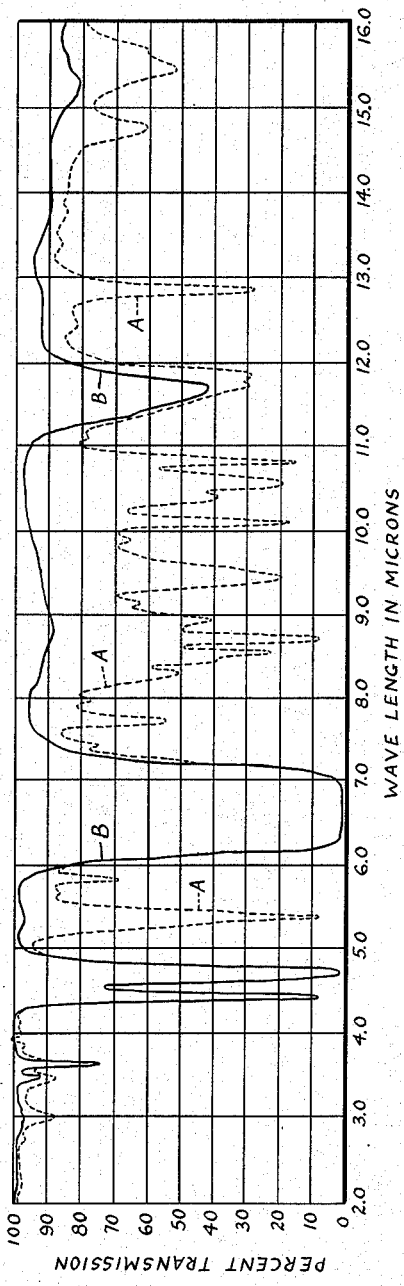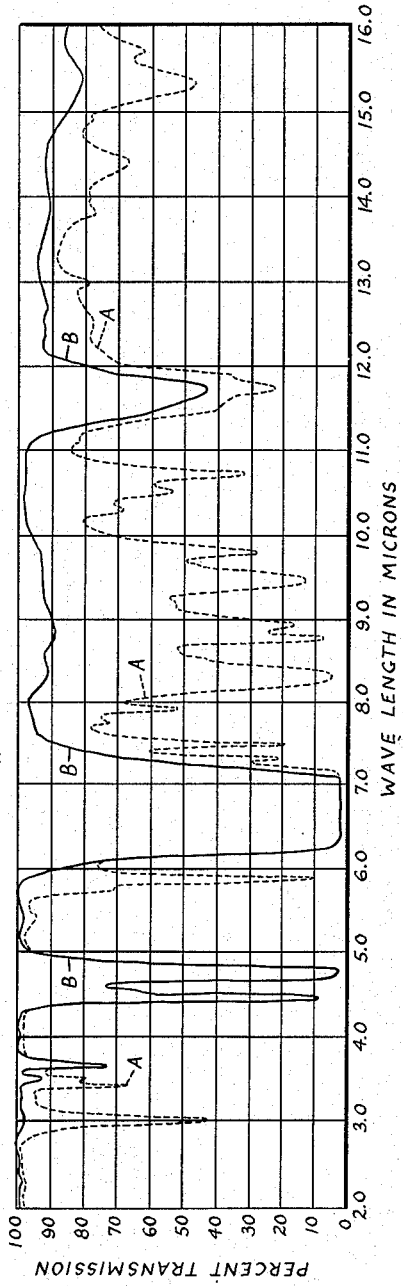

2,616,928

UNITED STATES PATENT OFFICE 2,616,928

PROCESS FOR PREPARING DECACHLORO-TETRAHYDRO-4,7-METHANOINDENEONE

Everett E. Gilbert, Flushing, and Silvio L. Giolito, New York, N. Y., assignors to Allied Chemical & Dye Corporation, New York, N. Y., a corporation of New York Application November 17, 1950, Serial No. 196,123

5 Claims. (Cl. 260—586)

This invention relates to a method for preparing a decachloro-tetrahydro-4,7-methanoindeneone by condensing two molecules of hexachlorocyclopentadiene with the aid of sulfur trioxide to form a hexachlorocyclopentadiene-$SO_3$ reaction product and hydrolyzing the reaction product to the ketone.

The resulting decachloro-tetrahydro-4,7-methanoindeneone is useful as an insecticide, as a fungicide, and as a moth-proofing agent, as disclosed and claimed in co-pending application Serial No. 196,121, filed November 17, 1950.

The exact mechanism of the new reaction, particularly in its intermediate stages, is not clearly understood, but the overall reaction is indicated in the equation set forth below:

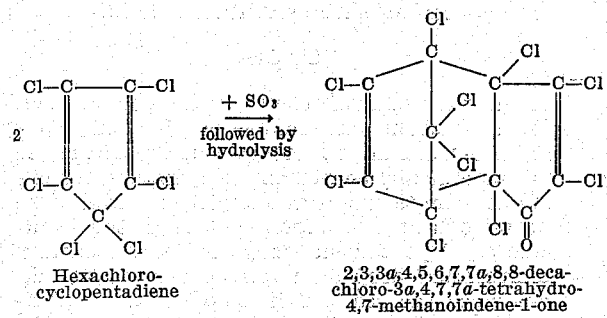

Hexachlorocyclopentadiene 2,3,3a,4,5,6,7,7a,8,8-decachloro-3a,4,7,7a-tetrahydro-4,7-methanoindene-1-one The intermediate stages of the reaction are believed to proceed somewhat as illustrated below:

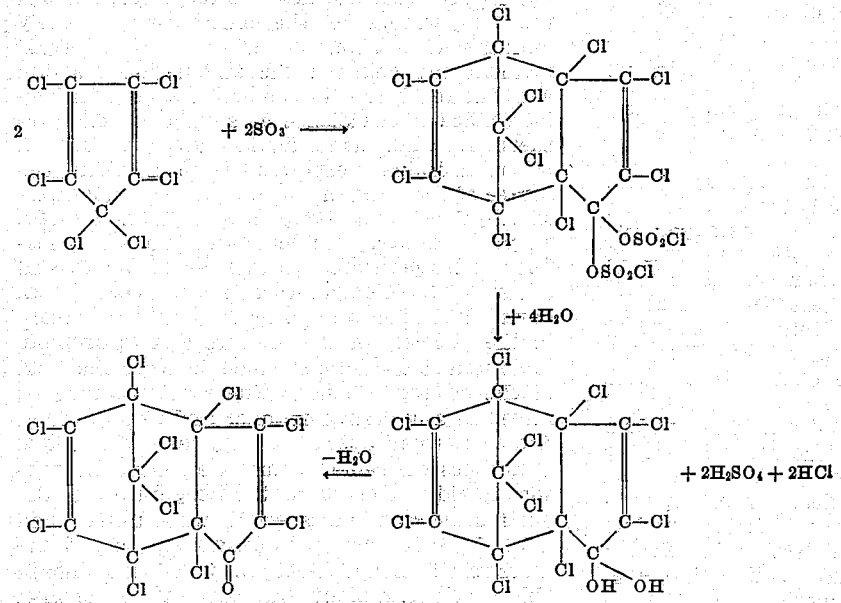

The drawings, Figs. 1–4 inclusive, represent infrared spectrograms of the decachlorotetrahydro-4,7-methanoindeneone prepared according to our invention, and of certain of its reaction products with other organic compounds.

In the drawings:

Fig. 1 represents the infrared spectrogram of the decachlorotetrahydro-4,7-methanoindeneone, as obtained in carbon disulfide solution, the several lines showing the spectrograms recorded of samples of different degrees of hydration; dotted line A being the record of substantially anhydrous material (0.10%, 0.03 mol, $H_2O$); solid line B being the record of a slightly hydrated sample (0.84%, 0.24 mol, $H_2O$); while solid line C is the record of an essentially monohydrated sample (2.86%, 0.8 mol, $H_2O$). The three spectrograms are considered substantially identical.

Solid line D is the spectrogram of the carbon disulfide solvent.

Fig. 2 represents the infrared spectrogram of the reaction product of the decachlorotetrahydro-4,7-methanoindeneone with $PCl_5$, shown as broken line A, and of the compound obtained by the reaction of hexachlorocyclopentadiene with AlCl₃ by known methods, shown as solid line B, both as obtained in carbon disulfide solution. The two spectrograms are substantially identical (except for minor variations due to small quantities of impurities), hence the products prepared by the two processes are identical.

Fig. 3 represents the infrared spectrogram, shown as broken line A, of the reaction product of our new compound with acetic anhydride as described hereinafter. This spectrogram is similarly superimposed on the spectrogram, shown as solid line B, of the carbon disulfide solvent.

Fig. 4 represents the infrared spectrogram, shown as broken line A, of the product obtained by reacting our new compound successively with acetic anhydride and then with ethyl alcohol as described hereinafter. This spectrogram is similarly superimposed on the spectrogram of carbon disulfide, used as solvent, and shown as solid line B.

In carrying out our process for preparing the decachlorotetrahydro-4,7-methanoindeneone compound above described, hexachlorocyclopentadiene and sulfur trioxide are mixed by charging them, either simultaneously or separately, to a reaction vessel. After mixing the reactants, the charge may be digested for a short period, sufficient to condense two molecules of hexachlorocyclopentadiene and to form a liquid reaction product of hexachlorocyclopentadiene and sulfur trioxide.

The liquid SO₃-hexachlorocyclopentadiene reaction product thus formed is then hydrolyzed to the decachloromethanoindeneone by drowning the reaction product in a relatively large volume of an aqueous drowning medium, preferably an alkaline aqueous medium, for example, in at least about 5 volumes of drowning medium per volume of reaction product.

After addition of the reaction product to the drowning medium is complete, the mixture may be digested for a short additional period, for example a half hour, to insure completion of the hydrolysis.

The product may be filtered at this stage, if desired, but to improve coagulation and ease of filtration, we prefer to agitate the batch for a short period at a temperature somewhat higher than the drowning temperature, for example at about 90°–95° C. for about a half hour, during which the crystalline product may partially or completely redissolve.

When the drowning has been effected in an alkaline solution, the charge is then neutralized, for example with sulfuric acid, whereupon the crystalline product reprecipitates. The amount of acid added for neutralization should be sufficient to bring the mixture preferably to neutrality, or to a very slight alkalinity not exceeding about 0.05% NaOH, as indicated by a pH of 7–8.

After neutralization, the charge is agitated, preferably at a temperature between about 90° C. and about 95° C., for about a half hour while maintaining the mixture at the neutral point or slightly on the alkaline side.

The mixture is then cooled, for example to room temperature to insure relatively complete precipitation of the product, leaving in solution the salts formed in the neutralization step, e. g. alkali metal or ammonium chloride and sulfate.

Separation of the precipitated product may be effected in any desired manner, for example by filtration, centrifugation, etc., and the recovered product may be dried and ground for storage or use. The final product is obtained in hydrate form as a white or light gray solid. The decachlorotetrahydro-4,7-methanoindeneone of our invention may exist in all degrees of hydration from substantially anhydrous to an undried gelatinous solid ostensibly containing 67.3 mols H₂O per mol anhydrous material. A number of examples—chosen at random—are shown in Table I below:

TABLE I

| Sample No. | Weight Percent H₂O | Mols H₂O per Mol Anhydrous Compound | Comment |
|---|---|---|---|
|  | 0 | 0 | Theory for anhydrous compound. |
|  | 3.54 | 1 | Theory for monohydrate. |
|  | 6.84 | 2 | Theory for dihydrate. |
| 1 | 4.76 | 1.36 | Dried 18 hours at 90° C. |
| 2 | 1.70 | 0.47 | Dried 72 hours at 90° C. |
| 3 | 10.90 | 3.33 | Dried 72 hours at 27° C. |
| 4 | 3.02 | 0.85 |  |
| 5 | 3.04 | 0.86 |  |
| 6 | 71.2 | 67.3 |  |
| 7 | 3.20 | 0.90 |  |
| 8 | 0.10 | 0.03 |  |
| 9 | 2.7 | 0.77 |  |

The sulfur trioxide used as the condensing agent may be added in any suitable form, for example as liquid or gaseous SO₃; or dissolved in an inert solvent such as sulfuryl chloride

(SO₂Cl₂)

or in the form of oleum, preferably a high strength oleum, for example 60% oleum. Mixing of SO₃ and hexachlorocyclopentadiene may be initiated at any convenient temperature, for example room temperature (25° C.) or below. The negative heat of solution of SO₃ in the hexachlorocyclopentadiene may cause momentary temperature drop of a few degrees centigrade, but since the reaction is exothermic, the temperature will usually soon rise spontaneously. If not, the mixture may be heated gently to initiate the reaction. However, during the mixing of SO₃ with the hexachlorocyclopentadiene, the temperature of the charge is preferably maintained at about 35° C. or above to avoid momentarily delaying the sulfonation reaction with the result that the cumulative reaction may take place with violence at a later stage. Furthermore, when using liquid SO₃ as a reactant, it is undesirable to exceed about 45° C. during the course of the addition since liquid SO₃ volatilizes slightly below this temperature. In any event, we prefer to carry out the addition of the reactants at temperatures between about 35° C. and about 70° C. Temperatures above about 70° C. during SO₃ addition appear to cause an increase in the viscosity of the mixture and to promote undesired side reactions which decrease the yield of the desired product. The reactants may be mixed in any desired manner and in any order. However, when operating on a large scale, it is sometimes desirable to mix the reactants stepwise to aid in controlling the temperature of the exothermic reaction, especially when using liquid SO₃. In such cases it is convenient to add the more volatile SO₃ (B. P. 43° C.) to the liquid hexachlorocyclopentadiene gradually or portionwise. A digestion step at a temperature above the reaction temperature, for example about 80° C., may be carried out, if desired, following completion of mixing of the reactants.

The ratio of $SO_3$ to hexachlorocyclopentadiene for good yields of reaction product should be at least 1:1, and we have found that a slight molar excess of $SO_3$ over hexachlorocyclopentadiene, for example 1.5:1, improves the yield, and eliminates unreacted hexachlorocyclopentadiene residue in the charge which otherwise would have to be removed from the charge by a separate operating step, such as, for example, steam distillation.

The hydrolysis of the hexachlorocyclopentadiene-$SO_3$ reaction product may be effected, if desired, by simply drowning the mass in water. However, the extremely corrosive nature of the spent acid thus obtained, containing both sulfuric and hydrochloric acids, makes such solutions extremely difficult to handle in metallic equipment. Accordingly, we prefer to carry out the drowning step in a weak alkali solution, for example a weak alkali metal hydroxide solution. Ammonia or the alkali metal carbonates may be used if desired, but are not as satisfactory as the alkali metal hydroxides as they tend to cause foaming of the charge and sometimes gelling of the precipitated product, rendering it difficult to separate or filter. The use of alkali metal hydroxide concentrations above above 10%, however, appear to cause considerable thickening upon neutralization. Accordingly, we prefer to employ alkali metal hydroxide solutions of not more than about 10% concentration by weight, for example concentrations of between about 6% and about 8% being satisfactory. The aqueous drowning solution should preferably be warm, for example at least about 40° C. at the start of the drowning operation. The charge of reaction product is added rather slowly to the drowning medium, and the temperature rises somewhat due to the exothermic nature of the reaction. When the temperature has risen to about 60°–70° C., external cooling is provided and the remainder of the charge added, preferably while maintaining the temperature between about 60° C. and about 70° C. Upon addition of the reaction product to the drowning medium, droplets usually form which gradually whiten in color due to the formation of crystalline decachloromethanoindeneone product; and these droplets gradually disperse to liberate a fine white crystalline precipitate.

As pointed out above, it is desirable to follow the drowning step with a digestion step of short duration, for example between about 30 and about 60 minutes, at an elevated temperature, for example 90°–95° C., to insure complete hydrolysis.

In general, the temperature during the drowning operation appears to determine to a considerable extent the physical character of the resulting precipitated product, a digestion period at an elevated temperature, e. g. ca. 90°–95° C., both before and after neutralization aiding in the formation of a crystalline product which is readily separated from the solution, whereas drowning at lower temperatures, for example 50°–60° C. without a digestion step at the higher temperature indicated above, results in a gelatinous precipitate which is difficult to separate from the reaction mixture. Accordingly, we prefer to carry out the drowning and neutralizing operation under approximately the temperature-time conditions illustrated in the schedule set out in Table II below:

TABLE II

*Drowning conditions (6% NaOH Soln.)*

| Step | Time (min.) | Temp., °C. | Control by— |
|---|---|---|---|
| Addition of Adduct | 30–60 | 50–70 | Cooling. |
| Cooking | 30 | 60–70 | Cooling and/or heating. |
| Heating to 95° C | 30 | 70–95 | Heating. |
| Cooking | 30 | 90–95 | Do. |
| Neutralization | 30 | 90–95 | Cooling and/or heating. |
| Cooking | 30 | 90–95 | Heating. |
| Total Time hrs | 3–3½ | | |
| Cooling | | 90–30 | Cooling. |

In order to identify the compound prepared according to our invention and others described herein, their infrared spectrograms were measured and recorded.

The infrared spectrograms shown in the figures were prepared on a standard infrared recording spectrophotometer designed for measuring and recording the infrared transmission of solids, liquids and gases, comprising a double infrared beam which scans the spectrum through the wave length range 2.0 to 16 microns, one part of the beam passing through the sample under study, the other passing through a compensating cell. If the sample under study absorbs radiation, the two beams become unequal. The magnitude of this inequality is a measure of the transmission by the sample of the particular wave length, and the record of these differences within the range of wave lengths scanned is the infrared spectrogram, recorded as an ink drawn line on a chart graduated in percent transmission as ordinates and in wave length as abscissae.

Solid samples, such as the compound of our invention and the related compounds described, are conveniently measured in solution. The spectrograms shown in the figures were all measured by dissolving 0.5 gram of the solid in carbon disulfide and diluting to 10 ml. with the solvent. A small amount of the solution was then introduced into a liquid cell with sodium chloride windows and sealed. The cell was placed in the spectrophotometer in the path of one of the beams as described above.

The infrared spectrogram of any chemical compound serves as an accurate means for identifying the compound. It has been compared with a human fingerprint in its ability to identify a compound with certainty. The characteristic reproducibility of the infrared spectrogram of a given compound is due to the facts that when a molecule is excited by infrared radiation it absorbs energy to a greater degree at some wave lengths than at others, and that the amount of absorption depends on the configuration and upon the linkages of the atoms composing the molecule. Accordingly, the compound prepared according to our invention, and also the other compounds shown in the several figures, are identified and characterized with certainty by their individual spectrograms. The spectrogram of the decachlorotetrahydro-4,7-methanoindeneone prepared according to our invention, which as a solid, exists in various degrees of hydration as pointed out above, is the same regardless of the degree of hydration. This sameness may be explained by the assumption that when the sample is dissolved in the hydrophobic carbon disulfide solvent, most of the water of hydration is disassociated from the compound so that what is measured is the spectrogram of the product itself, or of a hydrate containing only a small amount of water. Regardless of any explanation, the characteristic spectrogram persists and is independent of the degree of hydration (while the three spectrograms of the decachlorotetrahydo-4,7-methanoindeneone compound shown in Fig. 1 exhibit slight variations, these variations are not considered significant).

The following specific examples further illustrate the invention. Parts are by weight except as otherwise indicated.

EXAMPLE 1

A charge of 188 parts (.69 mol) of hexachlorocyclopentadiene was cooled to 5°–10° C., and to the agitated charge was added gradually 940 parts of 60% oleum (containing 565 parts (7.1 mols) of free $SO_3$). After addition of all the oleum, which required about one hour, the mixture, whose temperature had risen progressively to about 70° C., was added slowly to a large volume (5000 parts) of water to dilute the acid. The crude decachloromethanoindeneone precipitated immediately, upon contact of the charge with the water, as a white solid. The product was filtered from the spent acid, stirred three times with fresh water, and filtered after each water wash, to remove most of the sulfuric acid. The product was further purified by dissolving it in 500 parts 95% ethanol, reprecipitating by the addition of 500 parts water, filtering and drying. 126 parts of purified decachlorotetrahydro-4,7-methanoindeneone hydrate were obtained representing a yield of 72% of theoretical.

EXAMPLE 2

240 parts (3 mols) of liquid $SO_3$ were added rapidly to a stirred solution of 818.1 parts (3 mols) of hexachlorocyclopentadiene and 563 parts (4.17 mols) of sulfuryl chloride ($SO_2Cl_2$) which was at room temperature. With the addition of the $SO_3$, the charge temperature rose from 25° C. to 30° C. The charge was then heated gently for four hours at 80° C., then cooled and added with stirring to 5000 parts of water, upon which a white solid precipitated. The mixture was stirred for a half hour, filtered, and twice again mixed with water, stirred and filtered. The solid precipitated product was dissolved in about 2000 parts of methyl alcohol, decolorized with active carbon, the clarified solution drowned in water to precipitate the product, which, upon filtration and drying, yielded 532 parts of decachlorotetrahydro - 4,7 - methanoindeneone hydrate, corresponding to a yield of 70% of theoretical.

EXAMPLE 3

To 50 parts (0.18 mol) of hexachlorocyclopentadiene at room temperature (25° C.) was added dropwise with stirring 14.7 parts (0.18 mol) of liquid $SO_3$ over a period of about 15 minutes. After the $SO_3$ had been added, the charge was heated to 80° C. for four hours on a water bath. Then the reaction mixture, a dark red viscous liquid, was poured slowly with stirring into 500 parts of cold water. A white flocculent precipitate formed which was filtered and washed several times with water. This solid reaction product was worked up as described in previous examples to give a final yield of 24.1 parts of decachlorotetrahydro-4,7-methanoindeneone hydrate corresponding to 53% of theoretical.

EXAMPLE 4

273 parts (1.0 mol) of hexachlorocyclopentadiene and 120 parts (1.5 mols) of liquid sulfur trioxide were charged simultaneously to a reaction vessel at room temperature (about 25°) while agitating. Upon mixing, the temperature dropped momentarily an increment of about 5° C. due to negative heat of solution. The temperature then rose spontaneously to 40° C. due to heat of reaction. The reaction temperature was maintained between about 40° C. and about 45° C. for a two hour period while continuing the agitation and while cooling the charge with cooling water circulated through an external water jacket. Following the reaction period, the temperature was gradually raised over a three hour period from 45° C. to 65° C. by external heating. The mixture remained an oily mass throughout the reaction period, but became more viscous as the reaction proceeded, the color changing to a dark red. The mixture was then cooled to room temperature and yielded 390 parts of hexachlorocyclopentadiene-$SO_3$ reaction product, which was dark red in color and had the consistency of molasses.

The hexachlorocyclopentadiene-$SO_3$ reaction product was hydrolyzed by slowly pouring the 390 parts of reaction product, obtained as described in the previous paragraph, into an aqueous alkaline solution containing 3100 parts of water and 200 parts of sodium hydroxide (a 6% solution) at a temperature of 40° C. to 50° C. The addition of reaction product consumed about half an hour. A mildly exothermic reaction ensued, the heat of which was soon dissipated by the large volume of the alkaline solution. When about half of the reaction product had been added, the temperature had risen to 50° C. to 60° C. and thereafter cooling was applied during the remainder of the addition to maintain the temperature between 60° C. and 70° C. The thick droplets which formed upon drowning the reaction product, slowly whitened in color and gradually dispersed to fine white particles. After addition of the reaction product was complete, the slurry mixture was digested for about one-half hour while continuing the agitation and while maintaining the temperature between 60° C. and 70° C. The temperature of the mixture was then raised and maintained between 90° C. and 95° C. for an additional half hour in order to insure complete hydroysis, whereupon considerable of the crystalline product redissolved in the alkaline solution. Then the mass was neutralized with sulfuric acid by slowly adding over a one hour period, 20 parts of $H_2SO_4$ as 100% to a very slight alkalinity not exceeding about 0.05% NaOH, as indicated by a pH of 7-8. During the course of the neutralization, some of the decachlorotetrahydromethanoindeneone product separated in gelatinous form making continued agitation difficult. However, upon continuing the agitation, the neutral mixture began to coagulate and soon the mixture again became white in color due to separation of the solid product. Agitation of the mixture was continued at 90° C. for an additional half hour while maintaining the pH value at the above figure. The mixture was then cooled to room temperature (about 25° C.) to complete crystallization of the decachlorotetrahydromethanoindeneone hydrate. The crystalline product was separated by filtration which was completed in about 10 minutes. The filter cake was washed with water until the filtrate was clear and colorless. The wet filter cake, amounting to 800 parts, was dried in an oven at 110°–115° C. requiring about 36 hours to drive off the water and to bring the cake to constant weight. The dry filter cake amounted to 218 parts corresponding to a yield of decachlorotetrahydromethanoindeneone hydrate of 86% of theoretical. The dry product was cooled to 50° C. and pulverized.

The products obtained as described in each of the above examples, had infrared spectrograms substantially identical with those illustrated in Fig. 1 of the drawings.

A portion of decachlorotetrahydro-4,7-methanoindeneone hydrate obtained as described in the foregoing examples was purified and dehydrated by repeated vacuum sublimation and analyzed. It had the following analysis as compared to theoretical for $C_{10}Cl_{10}O$.

|  | Percent Theory ($C_{10}Cl_{10}O$) | Percent Found |
| --- | --- | --- |
| Cl | 72.3 | 72.7 |
| O | 24.4 | 23.8 |
| H | 0 | 0.6 |
| $H_2O$ | 0 | 0.1 |
| Mol Wt | 491 | 496 |

The decachlorotetrahydro-4,7 - methanoindeneone hydrate prepared according to our invention is a white crystalline solid with no appreciable odor. Upon heating in a glass melting point tube by conventional procedures up to 300° C., no tendency to melt is noted. It sublimes when heated in the atmosphere; for example, slight sublimation occurs upon oven drying at 110°–115° C. while upon heating at 140° C. at 1–1.5 mm. of Hg pressure, 10–15% of its weight sublimes in three hours. It sublimes with some decomposition when heated in the open atmosphere to 300° C. It is readily soluble in acetone, lower aliphatic alcohols, ethers and the like, and also in nitrobenzene and sulfuryl chloride. It is somewhat less soluble in benzene, toluene, hexane and petroleum ether, but is sufficiently soluble in warm hexane to allow the use of this material as a recrystallizing solvent if desired. It is virtually insoluble in cold water and only slightly soluble (less than 0.4%) in boiling water. It tends to gel upon separation by cooling, from hot solutions in hydrocarbon solvents. A satisfactory recrystallizing solvent is 85%–90% aqueous ethanol from which gelation does not occur. It usually exists as a crystalline hydrate when exposed to atmospheric conditions and is useful for insecticidal, etc., purposes in hydrate form. The compound prepared according to our invention is soluble in, and relatively stable toward, strong caustic solutions such as sodium, postassium, and calcium hydroxides. It is identified with certainty by the infrared spectrogram shown in Fig. 1.

The stability towards caustic materials of the compound prepared according to our invention is of advantage in the use of the compound as a pesticide in combination with lime and other alkaline agricultural chemicals, and in this respect it is superior to benzene hexachloride (BHC) and dichlorodiphenyltrichloroethane (DDT) which decompose readily in contact with alkalis. Furthermore, the compound prepared according to our invention, being volatile under normal atmospheric conditions only at temperatures considerably above those usually encountered in use, has a high residual insecticidal activity, and because of its limited solubility in hydrocarbon solvents is considerably more resistant to dry cleaning than DDT, which is an advantage in the use of the compound as a mothproofing agent.

The compound prepared according to our invention is believed to be the 2,3,3a,4,5,6,7,7a,8,8-decachloro-3a,4,7,7a - tetrahydro - 4,7-methano- indene-1-one, illustrated in the equations set forth above.

The method of preparation and the reactions of the compound are consistent with the ketonic structure—namely, reaction with phosphorus pentachloride, with butyric anhydride, with acetic anhydride and the further reaction of the acetic anhydride reaction product with ethyl alcohol, and formation of a phenylhydrazone. Strong indications that the ketone group is in the 1 position as shown (and not one of the two other theoretically possible monoketones having having the keto group in the 2 or the 8 position) are furnished by the reaction with phosphorus pentachloride and its stability to heat. Proof that the product contains a "hexachlorocyclopentadiene rest" as part of its structure is shown by the fact that high temperature pyrolysis of the compound yields a substantial quantity of hexachlorocyclopentadiene.

Reactions of the decachlorotetrahydromethanoindeneone product with the following: phosphorus pentachloride, butyric anhydride, acetic anhydride; and the further reaction of the acetic anhydride reaction product with ethyl alcohol are described in the following examples.

EXAMPLE 5

Five parts of hydrated decachlorotetrahydromethanoindeneone prepared as described in Example 4—purified by solution in methanol, precipitation with water and drying—were mixed with 21 parts of phosphorus pentachloride and the mixture heated for three hours at 125°–150° C. The resulting oily product was cooled to 20° C. and drowned in water. The solid material which formed was filtered and water washed, then washed with methanol to dissolve any unreacted decachlorotetrahydromethanoindeneone which might be present, and dissolved in hot benzene. The benzene solution was mixed with a large excess of methanol to reprecipitate the product which was filtered, dried and then recrystallized from isopropanol. Two parts of hexachlorocyclopentadiene dimer were obtained. An infrared spectogram prepared from this product was found to correspond to that shown as broken line A in Fig. 2 and to be identical with the dimer of hexachlorocyclopentadiene prepared by reacting hexachlorocyclopentadiene with aluminum chloride as described in JACS 71, page 954 (March 1949), in physical properties as well as its infrared spectogram, shown as solid line B in Fig. 2.

EXAMPLE 6

One hundred parts of the decachlorotetrahydromethanoindeneone hydrate prepared as described in Example 4 recrystallized from methyl alcohol and clarified with active carbon were mixed with 500 parts of freshly distilled acetic anhydride and the mixture was refluxed at 138° C. for six hours. The mixture was then vacuum distilled to remove the bulk of the unreacted acetic anhydride, leaving a slurry which was filtered. The crude solid amounted to 65 parts and melted at 138°–140° C. A portion of the crude solid was purified by recrystallizing from high boiling petroleum ether. The resulting purified acetate of decachlorotetrahydromethanoindeneone had a melting point of 142° C. Upon heating with water or dilute acetic acid for two hours at 95° C., it was converted to a solid melting at 191°–194° C.

EXAMPLE 7

Fifty parts of decachlorotetrahydromethanoindeneone hydrate prepared as described in Example 4 and purified by recrystallization were mixed with 312 parts of acetic anhydride and the mixture was refluxed for 3½ hours. After cooling the mixture to room temperature, it was drowned in several times its volume of cold water and allowed to stand overnight in contact with the water. A precipitate formed which was filtered and dried, producing a yield of 36 parts of crude product which melted from 238°–245° C. The crude product was recrystallized from isopropanol in the presence of decolorizing carbon, yielding a product melting at 231°–234° C. A further recrystallization from petroleum ether yielded a product melting at 251°–255° C. and apparently being a hydrated acetate of decachlorotetrahydromethanoindeneone. It had an infrared spectrogram corresponding to that shown as the broken line A in Fig. 3.

EXAMPLE 8

125 parts of decachlorotetrahydromethanoindeneone hydrate purified by recrystallization from methanol, after clarification with decolorizing carbon were mixed with 700 parts of acetic anhydride and were heated at 135°–140° C. for 4½ hours. The reaction mixture was then cooled to room temperature, poured into 4000 parts of cold water and allowed to stand in contact with the water overnight to form and precipitate the hydrated acetate of decachlorotetrahydromethanoindeneone. The precipitate was then filtered, washed with water and dried, yielding 133 parts of crude acetate.

The crude acetate of decachlorotetrahydromethanoindeneone prepared above was mixed with 800 parts 95% ethyl alcohol and gently refluxed for 20 hours. During the initial portion of the heating, the mixture remained as a slurry. As reaction occurred, the solid alcoholate reaction product dissolved in the alcohol. After refluxing as described, the solution was evaporated to 350 ml, and cooled to 10° C. to bring about crystallization of the product. Upon filtration, 62 parts of product were obtained which upon purification by recrystallization from ethyl alcohol in the presence of decolorizing carbon yielded a purified dialcoholate of decachlorotetrahydromethanoindeneone melting at 123°–126° C. Its infrared spectogram was made and is shown as the broken line A in Fig. 4.

The acetate of decachlorotetrahydromethanoindeneone was reacted with methyl alcohol in a manner similar to that described above yielding a methyl alcoholate reaction product melting at 146° C.; and with isopropanol yielding an isopropyl alcoholate melting at 127° C.

EXAMPLE 9

Thirty parts of purified decachlorotetrahydromethanoindeneone hydrate were mixed with 90 parts of butyric anhydride. The mixture was refluxed for three hours at 190° C. The reaction mixture was then treated several times with boiling water, causing separation of an oily layer which finally solidified. 27 parts of solid product were obtained and were recrystallized from ethyl alcohol in the presence of decolorizing carbon, yielding a monobutyrate of decachlorotetrahydromethanoindeneone melting at 173° C.

While the above describes the preferred embodiments of our invention, it will be understood that departures may be made therefrom within the scope of the specification and claims.

We claim:

1. The method of making a decachlorotetrahydro-4,7-methanoindeneone which comprises mixing hexachlorocyclopentadiene and sulfur trioxide at temperatures between about 35° C. and about 70° C. to form a reaction product thereof, and hydrolyzing the reaction product.

2. The method of making a decachlorotetrahydro-4,7-methanoindeneone which comprises mixing hexachlorocyclopentadiene and sulfur trioxide at temperatures between about 35° C. and about 70° C. to form a reaction product thereof, and drowning the thus formed reaction product in at least about 5 volumes of an aqueous drowning medium per volume of reaction mixture to hydrolyze the reaction product to the hydrate of the decachlorotetrahydro-4,7-methanoindeneone.

3. In a process for preparing decachlorotetrahydro-4,7-methanoindeneone, the steps which comprise mixing hexachlorocyclopentadiene and sulfur trioxide at temperatures between about 35° C. and about 70° C. to form a reaction product thereof, drowning the thus formed reaction mixture in at least about 5 volumes of water, containing a small quantity of dissolved alkaline material, per volume of reaction mixture to hydrolyze the reaction product to the hydrate of the decachlorotetrahydro-4,7-methanoindeneone.

4. In a process for preparing decachlorotetrahydro-4,7-methanoindeneone, the steps which comprise mixing hexachlorocyclopentadiene and liquid sulfur trioxide at temperatures between about 35° C. and about 70° C. to form a reaction product thereof, drowning the thus formed reaction mixture in at least about 5 volumes of water containing a small quantity of dissolved caustic alkali per volume of reaction mixture to hydrolyze the reaction product to the hydrate of the decachlorotetrahydro-4,7-methanoindeneone.

5. In a process for preparing decachlorotetrahydro-4,7-methanoindeneone, the steps which comprise mixing hexachlorocyclopentadiene and liquid sulfur trioxide at temperatures between about 35° C. and about 70° C. to form a reaction product thereof, drowning the thus formed reaction mixture in at least about 5 volumes of water containing a small quantity of dissolved caustic alkali per volume of reaction mixture to hydrolyze the reaction product to the hydrate of the decachlorotetrahydro-4,7-methanoindeneone, digesting the charge at a temperature between about 90° C. and about 95° C. for at least about 30 minutes, neutralizing the mixture at said temperature, thereafter digesting the charge at said temperature for at least about an additional 30 minutes, cooling the mixture to precipitate the hydrated product in crystalline form, and recovering the crystalline product.

EVERETT E. GILBERT.
SILVIO L. GIOLITO.

REFERENCES CITED

The following references are of record in the file of this patent:

UNITED STATES PATENTS

| Number | Name | Date |
|---|---|---|
| 2,179,809 | Bockemuller | Nov. 14, 1939 |
| 2,481,157 | Schmerling | Sept. 6, 1949 |
| 2,493,009 | McBee et al. | Jan. 3, 1950 |

OTHER REFERENCES

Newcomer et al. J. Am. Chem. Soc., vol. 71, pp. 946–951, (March 1949).